United States Patent
Oota et al.

(10) Patent No.: US 10,350,860 B2
(45) Date of Patent: Jul. 16, 2019

(54) INTERMEDIATE FILM FOR LAMINATED GLASS, AND LAMINATED GLASS

(71) Applicant: SEKISUI CHEMICAL CO., LTD., Osaka (JP)

(72) Inventors: Yuusuke Oota, Shiga (JP); Yasuyuki Izu, Shiga (JP); Daisuke Nakajima, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 147 days.

(21) Appl. No.: 14/431,323

(22) PCT Filed: Sep. 30, 2013

(86) PCT No.: PCT/JP2013/076552
§ 371 (c)(1),
(2) Date: Mar. 26, 2015

(87) PCT Pub. No.: WO2014/051142
PCT Pub. Date: Apr. 3, 2014

(65) Prior Publication Data
US 2015/0246508 A1    Sep. 3, 2015

(30) Foreign Application Priority Data
Sep. 28, 2012    (JP) ................ 2012-218736

(51) Int. Cl.
*C08K 5/00*    (2006.01)
*C08K 5/07*    (2006.01)
(Continued)

(52) U.S. Cl.
CPC .. *B32B 17/10651* (2013.01); *B32B 17/10036* (2013.01); *B32B 17/10669* (2013.01);
(Continued)

(58) Field of Classification Search
None
See application file for complete search history.

(56) References Cited

U.S. PATENT DOCUMENTS 5,728,472 A * 3/1998 D'Errico ........... B32B 17/10688
428/436
2012/0068083 A1    3/2012 Labrot et al.
(Continued)

FOREIGN PATENT DOCUMENTS

EP    1 698 600    9/2006
EP    2 409 833    1/2012
(Continued)

OTHER PUBLICATIONS

International Search Report dated Dec. 17, 2013 in International (PCT) Application No. PCT/JP2013/076552.
(Continued)

*Primary Examiner* — Scott R. Walshon
*Assistant Examiner* — Elaine M Vazquez
(74) *Attorney, Agent, or Firm* — Wenderoth, Lind & Ponack, L.L.P.

(57) ABSTRACT

An object of the present invention is to provide an interlayer film for laminated glass which has high transparency, and can prevent flying pests from gathering thereon, and a laminated glass including the interlayer film for laminated glass.

The present invention provides an interlayer film for laminated glass including a thermoplastic resin layer containing a thermoplastic resin and one of a compound having a structure represented by the following general formula (1) and a compound having a structure represented by the following general formula (2):

[Chem. 1]

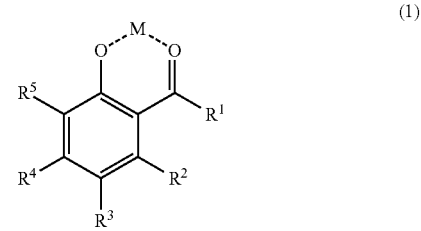

(1)

in the general formula (1), $R^1$, $R^2$, $R^3$, $R^4$ and $R^5$ are individually an organic group, and M is a polyvalent metal,

[Chem. 2]

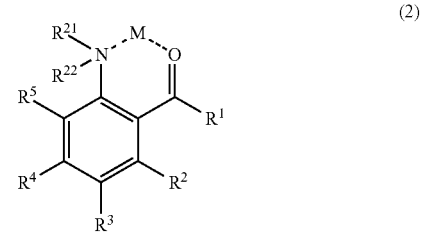

(2)

in the general formula (2), $R^1$, $R^2$, $R^3$, $R^4$, $R^5$, $R^{21}$ and $R^{22}$ are individually an organic group, and M is a polyvalent metal.

8 Claims, No Drawings

(51) Int. Cl.
*C08K 5/16* (2006.01)
*B32B 17/10* (2006.01)
*C08L 29/14* (2006.01)

(52) U.S. Cl.
CPC .. *B32B 17/10678* (2013.01); *B32B 17/10688* (2013.01); *B32B 17/10761* (2013.01); *C08K 5/0091* (2013.01); *C08K 5/07* (2013.01); *C08K 5/16* (2013.01); *B32B 2250/03* (2013.01); *B32B 2250/40* (2013.01); *B32B 2307/4026* (2013.01); *B32B 2307/412* (2013.01); *B32B 2605/006* (2013.01)

(56) References Cited

U.S. PATENT DOCUMENTS

| | | |
|---|---|---|
| 2013/0050983 A1 | 2/2013 | Labrot et al. |
| 2013/0202883 A1 | 8/2013 | Dekoninck et al. |
| 2013/0252001 A1 | 9/2013 | Sablayrolles et al. |
| 2014/0218803 A1 | 8/2014 | Labrot et al. |

FOREIGN PATENT DOCUMENTS

| | | |
|---|---|---|
| JP | 2000-300149 | 10/2000 |
| JP | 2001-504429 | 4/2001 |
| JP | 2005-206453 | 8/2005 |
| WO | 98/21269 | 5/1998 |
| WO | 2010/139889 | 12/2010 |
| WO | 2012/004535 | 1/2012 |
| WO | 2012/010444 | 1/2012 |
| WO | 2012/072950 | 6/2012 |
| WO | 2012/139788 | 10/2012 |

OTHER PUBLICATIONS

Extended European Search Report dated Apr. 18, 2016 in corresponding European Application No. 13840588.1.

* cited by examiner

INTERMEDIATE FILM FOR LAMINATED GLASS, AND LAMINATED GLASS

TECHNICAL FIELD

The present invention relates to an interlayer film for laminated glass which has high transparency, and can prevent flying pests from gathering thereon, and a laminated glass including the interlayer film for laminated glass.

BACKGROUND ART

Laminated glass has a variety of uses, such as in front, side and rear windshields of vehicles (e.g. automobiles) and windowpanes of aircraft, buildings, and the like, because it is a form of safety glass that is less likely to scatter even when broken by external impact. A known example of laminated glass is a laminated glass including at least a pair of glass plates integrated through, for example, an interlayer film for laminated glass which contains a liquid plasticizer and a polyvinyl acetal.

Such laminated glass is intended to be used under ultraviolet radiation from the Sun, and is able to sufficiently absorb ultraviolet light because of the presence of a conventional interlayer film for laminated glass which contains an ultraviolet absorber. However, conventional laminated glass cannot sufficiently shield light at wavelengths longer than 400 nm. Unfortunately, since pests in general respond to light at wavelengths of 450 nm or shorter, conventional laminated glass cannot prevent flying pests from gathering thereon.

As a means to solve this problem, Patent Literature 1 discloses an insect control laminated glass in which an interlayer film for laminated glass which contains a synthetic resin, an ultraviolet absorber, and a yellow dye is sandwiched between glass plates. The insect control laminated glass disclosed in Patent Literature 1 has high lighting, and absorbs visible light at wavelengths of 400 to 450 nm.

Although a yellow dye is an essential component to ensure that the interlayer film for laminated glass of Patent Literature 1 absorbs visible light at wavelengths of 400 to 450 nm, Patent Literature 1 does not discuss any methods for homogeneously dispersing the yellow dye in the interlayer film for laminated glass. It is difficult for the interlayer film for laminated glass of Patent Literature 1 to possess both features: high transparency; and prevention of flying pests from gathering thereon.

CITATION LIST

Patent Literature

Patent Literature 1: JP 2000-300149 A

SUMMARY OF INVENTION

Technical Problem

An object of the present invention is to provide an interlayer film for laminated glass which has high transparency, and can prevent flying pests from gathering thereon, and a laminated glass including the interlayer film for laminated glass.

Solution to Problem

The present invention provides an interlayer film for laminated glass which includes a thermoplastic resin layer containing a thermoplastic resin and one of a compound having a structure represented by the following general formula (1) and a compound having a structure represented by the following general formula (2).

[Chem. 1]

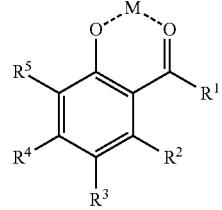
(1)

In the general formula (1), $R^1$, $R^2$, $R^3$, $R^4$ and $R^5$ are individually an organic group, and M is a polyvalent metal.

[Chem. 2]

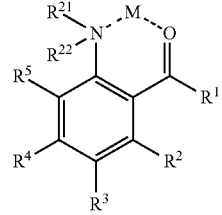
(2)

In the general formula (2), $R^1$, $R^2$, $R^3$, $R^4$, $R^5$, $R^{21}$ and $R^{22}$ are individually an organic group, and M is a polyvalent metal.

The present invention is described in detail below.

The present inventors made intensive investigations and consequently found that an interlayer film for laminated glass which includes a thermoplastic resin layer containing a thermoplastic resin and one of a compound having a structure represented by the general formula (1) (hereinafter, also referred to as "compound X") and a compound having a structure represented by the general formula (2) (hereinafter, also referred to as "compound Y") has high transparency, and can prevent flying pests from gathering thereon. This finding has led to the completion of the present invention.

The interlayer film for laminated glass of the present invention includes a thermoplastic resin layer containing a thermoplastic resin and one of compound X and compound Y.

The present inventors studied light absorbing materials in order to achieve absorption of visible light at wavelengths of 400 to 450 nm and high transparency. As a result, it was found that the use of an interlayer film for laminated glass which contains compound X or compound Y for the production of a laminated glass results in a laminated glass that not only can absorb visible light at wavelengths of 400 to 450 nm but also has high transparency. Generally, approximately 370 nm wavelength light and approximately 480 nm wavelength light are known to attract pests. The present inventors found that the use of an interlayer film for laminated glass which contains compound X or compound Y for the production of a laminated glass results in a laminated glass that not only can absorb approximately 370 nm wavelength light and approximately 480 nm wavelength light, but also has high transparency.

The interlayer film for laminated glass of the present invention may be a single-layered interlayer film consisting of the thermoplastic resin layer, or may be a multilayered interlayer film including the thermoplastic resin layer and a first resin layer on or above one surface of the thermoplastic resin layer. The first resin layer preferably contains a polyvinyl acetal. The first resin layer may be directly disposed on one surface of the thermoplastic resin layer. The thermoplastic resin layer may further be provided with a second resin layer on or above the other surface thereof, or the second resin layer may be provided on or above the opposite surface of the first resin layer to the surface on which the thermoplastic resin layer is disposed. The expression "the other surface of the thermoplastic resin layer" refers to the surface opposite to the "one surface".

The thermoplastic resin is not particularly limited, and examples include polyvinyl acetals, ethylene-vinyl acetate copolymers, urethane resin, and acrylic resin. In particular, a polyvinyl acetal is preferable in terms of good adhesion to glass.

The polyvinyl acetal is not particularly limited, as long as it is obtained by acetalization of polyvinyl alcohol with an aldehyde. Preferred is polyvinyl butyral. Two or more polyvinyl acetals may be used as needed.

As for the degree of acetalization of the polyvinyl acetal, the preferable lower limit is 40 mol %, the preferable upper limit is 85 mol %, the more preferable lower limit is 60 mol %, and the more preferable upper limit is 75 mol %.

As for the hydroxyl group content of the polyvinyl acetal, the preferable lower limit is 15 mol %, and the preferable upper limit is 35 mol %. When the hydroxyl group content is 15 mol % or more, the interlayer film for laminated glass can be easily formed; when the hydroxyl group content is 35 mol % or less, the resulting interlayer film for laminated glass is easy to handle.

The degree of acetalization and the hydroxyl group content can be measured in accordance with, for example, JIS K 6728, "Testing method for polyvinyl butyral".

The polyvinyl acetal can be prepared by acetalization of polyvinyl alcohol with an aldehyde. The polyvinyl alcohol is typically prepared by saponification of polyvinyl acetate, and a polyvinyl alcohol having a degree of saponification of 70 to 99.8 mol % is generally used.

As for the degree of polymerization of the polyvinyl alcohol, the preferable lower limit is 500, and the preferable upper limit is 4000. In the case of a polyvinyl alcohol with a degree of polymerization of 500 or more, a laminated glass having higher penetration resistance can be obtained. In the case of a polyvinyl alcohol with a degree of polymerization of 4000 or less, the interlayer film for laminated glass can be easily formed. The more preferable lower limit of the degree of polymerization of the polyvinyl alcohol is 1000, and the more preferable upper limit is 3600.

The aldehyde is not particularly limited, and typically, a C1 to C10 aldehyde is suitable. The C1 to C10 aldehyde is not particularly limited, and examples include n-butyl aldehyde, isobutyl aldehyde, n-valeraldehyde, 2-ethyl butyl aldehyde, n-hexyl aldehyde, n-octyl aldehyde, n-nonyl aldehyde, n-decyl aldehyde, formaldehyde, acetaldehyde, and benzaldehyde. Preferred among these are n-butyl aldehyde, n-hexyl aldehyde, and n-valeraldehyde, and more preferred is n-butyl aldehyde. Any of these aldehydes may be used alone, or two or more of them may be used in combination.

The interlayer film for laminated glass, which contains compound X or compound Y, not only can absorb visible light at wavelengths of 450 to 500 nm, but also has high transparency. Additionally, the interlayer film for laminated glass, which contains compound X or compound Y, not only can absorb approximately 370 nm wavelength light and approximately 480 nm wavelength light, but also has high transparency. This allows for production of a laminated glass that can prevent flying pests from gathering thereon, and has a high visible light transmittance and a low haze. In the case of a laminated glass including the interlayer film for laminated glass of the present invention between two clear glass plates (thickness: 2.5 mm), the visible light transmittance is preferably 70% or higher, as determined in accordance with JIS R 3212. In the case of a laminated glass including the interlayer film for laminated glass of the present invention between two clear glass plates (thickness: 2.5 mm), the haze is preferably 10% or lower, as determined in accordance with JIS K 7105. Some of conventional light absorbing materials are known to absorb visible light at wavelengths of 450 to 500 nm. Unfortunately, the use of an interlayer film for laminated glass which contains such a light absorbing material in a laminated glass results in low visible light transmittance or a high haze. In contrast, compound X ensures that the interlayer film for laminated glass has high transmittance, and can prevent flying pests from gathering thereon.

$R^1$ in the general formula (1) and the general formula (2) is not particularly limited, as long as it is an organic group. Preferred is an organic group including an ether bond or an aryl group. $R^1$ is preferably an organic group including an ether group in terms of improved solubility in a later-described plasticizer.

The organic group including an ether group is more preferably a group having a structure represented by —O—$R^{11}$. $R^{11}$ is more preferably a C1 to C10 alkyl group, still more preferably a C1 to C5 alkyl group, and particularly preferably a C1 to C3 alkyl group. Examples of the alkyl group include methyl group, ethyl group, propyl group, butyl group, and pentyl group. The alkyl group may have a linear backbone or a branched backbone.

The aryl group is more preferably a phenyl group or an aromatic ring with a hydroxyl group or alkoxy group. The aryl group is still more preferably an aromatic ring with a hydroxyl group or alkoxy group, and particularly preferably a C6 to C20 aryl group.

$R^2$ in the general formula (1) and the general formula (2) is not particularly limited, as long as it is an organic group. Preferred is a hydrogen atom or a hydroxyl group, and more preferred is a hydrogen atom.

$R^3$ in the general formula (1) and the general formula (2) is not particularly limited, as long as it is an organic group. Preferred is a hydrogen atom, a hydroxyl group, or $NR^{25}R^{26}$, and more preferred is a hydroxyl group or $NR^{25}R^{26}$. $R^{25}$ and $R^{26}$ are not particularly limited, as long as they are individually an organic group. Preferred is a hydrogen atom or an alkyl group, and more preferred is a hydrogen atom.

$R^4$ in the general formula (1) and the general formula (2) is not particularly limited, as long as it is an organic group. Preferred is a hydrogen atom, a hydroxyl group, or an organic group including an ester bond, and more preferred is an organic group including an ester bond. The organic group including an ester bond preferably includes a structure represented by —C(O)—O—$R^{41}$. $R^{41}$ is preferably an alkyl group or aryl group. The alkyl group is more preferably a C1 to C10 alkyl group, still more preferably a C1 to C5 alkyl group, and particularly preferably a C1 to C3 alkyl group.

Examples of the alkyl group include methyl group, ethyl group, propyl group, butyl group, and pentyl group. The alkyl group may have a linear backbone or a branched backbone.

The aryl group is more preferably a C6 to C20 aryl group, and still more preferably a C6 to C18 aryl group.

$R^5$ in the general formula (1) and the general formula (2) is not particularly limited, as long as it is an organic group. Preferred is a hydrogen atom or a hydroxyl group, and more preferred is a hydrogen atom.

$NR^{21}R^{22}$ in the general formula (2) is an amino group. $R^{21}$ and $R^{22}$ are not particularly limited, as long as they are individually an organic group. Preferred is a hydrogen atom or an alkyl group, and more preferred is a hydrogen atom.

M in the general formula (1) and the general formula (2) is not particularly limited, as long as it is a polyvalent metal. Preferred is a divalent metal. The divalent metal is preferably magnesium, calcium, strontium, barium or zinc in order to ensure that the interlayer film for laminated glass is more effective in preventing flying pests from gathering thereon, and has high transparency. More preferred is magnesium.

The amount of compound X or compound Y is not particularly limited, but the preferable lower limit is 0.001 parts by weight for 100 parts by weight of the thermoplastic resin, and the preferable upper limit is 15 parts by weight. When the amount of compound X or compound Y is the lower limit or more, flying pests can be more effectively prevented from gathering; when the amount is the upper limit or less, the interlayer film for laminated glass has much higher transparency. The more preferable lower limit of the amount of compound X is 0.01 parts by weight, the more preferable upper limit is 10 parts by weight, the still more preferable lower limit is 0.1 parts by weight, and still more preferable upper limit is 5 parts by weight.

Compound X can be prepared by any method without particular limitation, and specifically, can be prepared by reacting compound A having a structure represented by the general formula (3) with a polyvalent metal or a compound including a polyvalent metal, for example.

[Chem. 3]

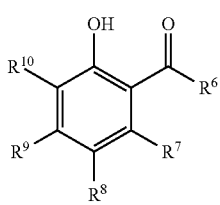

(3)

In the general formula (3), $R^6$, $R^7$, $R^8$, $R^9$ and $R^{10}$ are individually an organic group.

Compound Y can be prepared by any method without particular limitation, and specifically, can be prepared by reacting compound B having a structure represented by the general formula (4) with a polyvalent metal or a compound including a polyvalent metal, for example.

[Chem. 4]

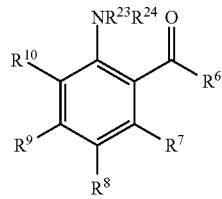

(4)

In the general formula (4), $R^6$, $R^7$, $R^8$, $R^9$, $R^{10}$, $R^{23}$ and $R^{24}$ are individually an organic group.

The reaction of compound A or compound B with a polyvalent metal or a compound including a polyvalent metal can be accomplished by the following methods, for example: a method of producing compound X or compound Y which involves stirring a mixture containing either compound A or compound B and either the polyvalent metal or the compound including a polyvalent metal as well as a later-described plasticizer; and a method of producing compound X or compound Y which involves applying a solution containing a solvent and either compound A or compound B to an interlayer film for laminated glass containing the thermoplastic resin and either the polyvalent metal or the compound including a polyvalent metal, and heating the interlayer film to evaporate the solvent. The compound including a polyvalent metal is not particularly limited. Preferred is a polyvalent metal salt, and more preferred is a polyvalent metal salt of a carboxylic acid.

$R^6$ in the general formula (3) or the general formula (4) is not particularly limited, as long as it is an organic group. Preferred is an organic group including an ether bond or an aryl group. $R^6$ is preferably an organic group including an ether bond in order to provide high solubility in a solvent.

The organic group including an ether bond more preferably has a structure represented by —O—$R^{61}$. $R^{61}$ is more preferably a C1 to 010 alkyl group, still more preferably a C1 to C5 alkyl group, and particularly preferably a C1 to C3 alkyl group. Examples of the alkyl group include methyl group, ethyl group, propyl group, butyl group, and pentyl group. The alkyl group may have a linear backbone or a branched backbone.

The aryl group is more preferably a C6 to C20 aryl group, and still more preferably a C6 to C18 aryl group.

$R^7$ in the general formula (3) or the general formula (4) is not particularly limited, as long as it is an organic group. Preferred is a hydrogen atom or a hydroxyl group, and more preferred is a hydrogen atom.

$R^8$ in the general formula (3) or the general formula (4) is not particularly limited, as long as it is an organic group. Preferred is a hydrogen atom, a hydroxyl group, or $NR^{27}R^{28}$, and more preferred is a hydroxyl group or $NR^{27}R^{28}$. $R^{27}$ and $R^{28}$ are not particularly limited, as long as they are individually an organic group. Preferred is a hydrogen atom or an alkyl group, and more preferred is a hydrogen atom.

$R^9$ in the general formula (3) or the general formula (4) is not particularly limited, as long as they are individually an organic group. Preferred is a hydrogen atom, a hydroxyl group, or an organic group including an ester bond, and more preferred is an organic group including an ester bond. The organic group including an ester bond preferably has a structure represented by —C(O)—O—$R^{91}$. $R^{91}$ is preferably an alkyl or aryl group. The alkyl group is more preferably a C1 to 010 alkyl group, still more preferably a C1 to C5 alkyl group, and particularly preferably a C1 to C3 alkyl group. Examples of the alkyl group include methyl group, ethyl group, propyl group, butyl group, and pentyl groups. The alkyl group may have a linear backbone or a branched backbone.

The aryl group is more preferably a C6 to C20 aryl group, and still more preferably a C6 to C18 aryl group.

$R^{10}$ in the general formula (3) or the general formula (4) is not particularly limited, as long as it is an organic group. Preferred is a hydrogen atom or a hydroxyl group, and more preferred is a hydrogen atom.

$NR^{23}R^{24}$ in the general formula (4) is an amino group. $R^{23}$ and $R^{24}$ are not particularly limited, as long as they are individually an organic group. Preferred is a hydrogen atom or an alkyl group, and more preferred is a hydrogen atom.

Examples of compound A include diethyl-2,5-dihydroxy-terephthalate ("diethyl-2,5-dihydroxyterephthalate" from Aldrich) and dimethyl-2,5-dihydroxyterephthalate. In particular, compound A is preferably diethyl-2,5-dihydroxyl-terephthalate in order to achieve display of an image with a much higher contrast.

Compound B is preferably, for example, diethyl-2,5-diaminoterephthalate (from Aldrich) in order to achieve display of an image with a much higher contrast.

The thermoplastic resin layer preferably contains an adhesion control agent. The adhesion control agent is not particularly limited. Preferred are metal salts, and at least one metal salt selected from the group consisting of alkali metal salts, alkaline earth metal salts, and magnesium salts is preferable. The metal salt preferably contains at least one of potassium and magnesium. The metal salt is more preferably an alkali metal salt of a C2 to C16 organic acid or an alkaline earth metal salt of a C2 to C16 organic acid, and still more preferably a C2 to C16 carboxylic acid magnesium salt or a C2 to C16 carboxylic acid potassium salt. The C2 to C16 carboxylic acid magnesium salt and the C2 to C16 carboxylic acid potassium salt are not particularly limited. Preferred examples include magnesium acetate, potassium acetate, magnesium propionate, potassium propionate, magnesium 2-ethylbutanoate, potassium 2-ethylbutanoate, magnesium 2-ethylhexanonate, and potassium 2-ethylhexanoate. In the case where the adhesion control agent contains the polyvalent metal, the adhesion control agent can be used as the compound including a polyvalent metal.

The amount of the adhesion control agent is not particularly limited, and the preferable lower limit is 0.0005 parts by weight for 100 parts by weight of the thermoplastic resin, and the preferable upper limit is 0.05 parts by weight. When the amount of the adhesion control agent is 0.0005 parts by weight or more, a laminated glass having higher penetration resistance can be obtained; when the amount of the adhesion control agent is 0.05 parts by weight or less, the interlayer film for laminated glass has much higher transparency. The more preferable lower limit of the amount of the adhesion control agent is 0.002 parts by weight, and the more preferable upper limit is 0.02 parts by weight.

The total amount of alkali metals, alkaline earth metals, and magnesium in the thermoplastic resin layer is preferably 300 ppm or less in order to ensure that the thermoplastic resin layer has high moisture resistance. For example, the alkali metals, alkaline earth metals, and magnesium may be metals derived from the adhesion control agent or from the compound including a polyvalent metal, or may be metals derived from a neutralizer used for the synthesis of the polyvinyl acetal. The total amount of alkali metals, alkaline earth metals, and magnesium in the thermoplastic resin layer is more preferably 200 ppm or less, still more preferably 150 ppm or less, and particularly preferably 100 ppm or less.

The amount of magnesium in the thermoplastic resin layer is not particularly limited. The preferable lower limit is 20 ppm, the preferable upper limit is 500 ppm, the more preferable lower limit is 50 ppm, the more preferable upper limit is 400 ppm, the still more preferable lower limit is 100 ppm, and the still more preferable upper limit is 300 ppm.

The amount of alkali metals, alkaline earth metals, and magnesium can be determined with an ICP emission spectrometer ("ICPE-9000" from Shimadzu Corp.).

The thermoplastic resin layer preferably further contains a dispersant. The presence of a dispersant prevents compound X and compound Y from aggregating, and provides much higher transparency to a laminated glass. Examples of the dispersant include compounds having a sulfonic acid structure such as salts of a linear alkylbenzenesulfonic acid, compounds having an ester structure such as diester compounds, alkyl esters of recinoleic acid, phthalic acid esters, adipic acid esters, sebacic acid esters, and phosphoric acid esters, compounds having an ether structure such as polyoxyethylene glycol, polyoxypropylene glycol, and alkylphenyl-polyoxyethylene-ethers, compounds having a carboxylic acid structure such as polycarboxylic acids, compounds having an amine structure such as laurylamine, dimethyllaurylamine, oleyl propylene diamine, polyoxyethylene secondary amines, polyoxyethylene tertiary amines, and polyoxyethylene diamines, compounds having a polyamine structure such as polyalkylene polyamine alkylene oxides, compounds having an amide structure such as oleic acid diethanolamide and fatty acid alkanolamides, and compounds having a high molecular weight amide structure such as polyvinyl pyrrolidone and polyester acid amide amine salts. Other examples include high molecular weight dispersants such as polyoxyethylene alkyl ether phosphoric acid (phosphate), polycarboxylic acid polymers, and condensed ricinoleic acid esters. The term "high molecular weight dispersant" is defined as referring to dispersants having a molecular weight of 10000 or higher.

In the case where the dispersant is used, the preferable lower limit of the amount of the dispersant is 1 part by weight for 100 parts by weight of compound X or compound Y in the thermoplastic resin layer, and the preferable upper limit is 50 parts by weight. In the case where the amount of the dispersant is within this range, compound X or compound Y can be homogeneously dispersed in the thermoplastic resin layer. The more preferable lower limit of the amount of the dispersant is 3 parts by weight, the more preferable upper limit is 30 parts by weight, the still more preferable lower limit is 5 parts by weight, and the still more preferable upper limit is 25 parts by weight.

The thermoplastic resin layer preferably further contains an ultraviolet absorber. The presence of an ultraviolet absorber in the thermoplastic resin layer improves the light-fastness of the thermoplastic resin layer. The thermoplastic resin layer may not contain any ultraviolet absorber. In order to ensure that the interlayer film for laminated glass has much higher transparency, the preferable upper limit of the amount of the ultraviolet absorber in the thermoplastic resin layer is 1 part by weight for 100 parts by weight of the thermoplastic resin, the more preferable upper limit is 0.5 parts by weight, the still more preferable upper limit is 0.2 parts by weight, and the particularly preferable upper limit is 0.1 parts by weight.

Examples of the ultraviolet absorber include compounds having an malonic acid ester structure, compounds having an oxalic anilide structure, compounds having a benzotriazole structure, compounds having a benzophenone structure, compounds having a triazine structure, compounds having a benzoate structure, and compounds having a hindered amine structure.

The thermoplastic resin layer may further contain a plasticizer as needed. The plasticizer is not particularly limited, and examples include organic ester plasticizers such as monoprotic organic acid esters and polyprotic organic acid esters, and phosphoric acid plasticizers such as organic phosphoric acid plasticizers and organic phosphorous acid plasticizers. The plasticizer is preferably a liquid plasticizer.

The monoprotic organic acid esters are not particularly limited, and examples include glycolesters obtainable by the reaction of a glycol (e.g. triethylene glycol, tetraethylene glycol, and tripropyleneglycol) and a monoprotic organic acid (e.g. butyric acid, isobutyric acid, caproic acid, 2-ethylbutyric acid, heptanoic acid, n-octylic acid, 2-ethylhexyl acid, pelargonic acid (n-nonylic acid), and decylic acid). In particular, triethylene glycol dicaproate, triethylene glycol di-2-ethylbutyrate, triethylene glycol di-n-octylate, and triethylene glycol di-2-ethylhexylate are preferable.

The polyprotic organic acid esters are not particularly limited, and examples include ester compounds of a polyprotic organic acid (e.g. adipic acid, sebacic acid, and azelaic acid) and a C4 to C8 linear or branched alcohol. In particular, dibutyl sebacate, dioctyl azelate, dibutylcarbitol adipate, and the like are preferable.

The organic ester plasticizers are not particularly limited, and examples include triethylene glycol di-2-ethyl butyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethyl butyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapriate, dihexyl adipate, dioctyl adipate, hexylcyclohexyl adipate, diisononyl adipate, heptyl nonyl adipate, dibutyl sebacate, oil-modified alkyd sebacate, mixtures of a phosphoric acid ester and an adipic acid ester, mixed adipic acid esters produced from an adipic acid ester, a C4 to C9 alkyl alcohol, and a C4 to C9 cyclic alcohol, and C6 to C8 adipic acid esters such as hexyl adipate.

The organic phosphoric acid plasticizers are not particularly limited, and examples include tributoxyethyl phosphate, isodecylphenyl phosphate, and triisopropyl phosphate.

Preferred among the plasticizers is at least one selected from the group consisting of dihexyladipate (DHA), triethylene glycol di-2-ethylhexanoate (3GO), tetraethylene glycol di-2-ethylhexanoate (4GO), triethylene glycol di-2-ethylbutylate (3GH), tetraethylene glycol di-2-ethylbutylate (4GH), tetraethylene glycol di-n-heptanoate (4G7), and triethylene glycol di-n-heptanoate (3G7).

Furthermore, the plasticizer preferably includes triethylene glycol di-2-ethylhexanoate (3GO), triethylene glycol di-2-ethylbutylate (3GH), tetraethylene glycol di-2-ethylhexanoate (4GO), or dihexyladipate (DHA), more preferably includes tetraethylene glycol di-2-ethylhexanoate (4GO) or triethylene glycol di-2-ethylhexanoate (3GO), and still more preferably includes triethylene glycol di-2-ethylhexanoate because they are less likely to undergo hydrolysis.

The amount of the plasticizer in the thermoplastic resin layer is not particularly limited, and the preferable lower limit is 30 parts by weight for 100 parts by weight of the thermoplastic resin, and the preferable upper limit is 70 parts by weight. When the amount of the plasticizer is 30 parts by weight or more, the interlayer film for laminated glass has low melt viscosity, which facilitates the formation of the interlayer film for laminated glass; when the amount of the plasticizer is 70 parts by weight or less, the interlayer film for laminated glass has much higher transparency. The more preferable lower limit of the amount of the plasticizer is 35 parts by weight, and the more preferable upper limit is 63 parts by weight.

The thermoplastic resin layer may contain additives such as an antioxidant, a photostabilizer, an antistatic agent, a blue pigment, a blue dye, a green pigment, and/or a green dye as needed.

The thermoplastic resin layer preferably contains an antioxidant because it provides high lightfastness. The antioxidant is not particularly limited, and examples include antioxidants having a phenolic structure, sulfur-containing antioxidants, and phosphorus-containing antioxidants.

The antioxidants having a phenolic structure are intended to include antioxidants having a phenolic backbone. Examples of the antioxidants having a phenolic structure include 2,6-di-t-butyl-p-cresol (BHT), butylated hydroxyanisole (BHA), 2,6-di-t-butyl-4-ethylphenol, stearyl-p-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl) butane, tetrakis[methylene-3-(3',5'-butyl-4-hydroxyphenyl) propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol) butyric acid glycol ester, and pentaerythritoltetrakis[3-(3,5-di-tert-butyl-4-hydroxyphenyl)propionate]. Any of the antioxidants may be used alone, or two or more of these may be used in combination.

The thickness of the thermoplastic resin layer is not particularly limited. The preferable lower limit thereof is 300 μm, and the preferable upper limit is 2000 μm. In the case where the thickness of the thermoplastic resin layer is within this range, the interlayer film for laminated glass is more effective in preventing flying pest from gathering thereon, and has much higher transparency. The more preferable lower limit of the thickness of the thermoplastic resin layer is 350 μm, and the more preferable upper limit is 1000 μm.

The interlayer film for laminated glass of the present invention may be a single-layered interlayer film consisting of the thermoplastic resin layer, or may be a multilayered interlayer film including the thermoplastic resin layer and a first resin layer on or above one surface of the thermoplastic resin layer. The first resin layer preferably contains a polyvinyl acetal. The first resin layer may be directly disposed on one surface of the thermoplastic resin layer.

The interlayer film for laminated glass of the present invention may further include a second resin layer on or above the other surface of the thermoplastic resin layer, or the second resin layer may be provided on or above the opposite surface of the first resin layer to the surface on which the thermoplastic resin layer is disposed. The second resin layer preferably contains a polyvinyl acetal. The expression "the other surface of the thermoplastic resin layer" refers to the surface opposite to the "one surface".

The polyvinyl acetal in the thermoplastic resin layer may be used as the polyvinyl acetal in the first resin layer and the second resin layer. The polyvinyl acetal in the first resin layer and the second resin layer may be the same as or different from the polyvinyl acetal in the thermoplastic resin layer.

In the case where the thermoplastic resin layer contains a plasticizer, the first resin layer and the second resin layer may contain the same plasticizer or a different plasticizer from that in the thermoplastic resin layer.

The first resin layer and the second resin layer preferably contain an adhesion control agent. The adhesion control agent is not particularly limited. Preferred are metal salts, and at least one metal salt selected from the group consisting of alkali metal salts, alkaline earth metal salts, and magnesium salts is more preferable. The metal salt preferably contains at least one of potassium and magnesium. The metal salt is more preferably an alkali metal salt of a C2 to C16 organic acid or an alkaline earth metal salt of a C2 to C16 organic acid, and still more preferably a C2 to C16 carboxylic acid magnesium salt or a C2 to C16 carboxylic acid potassium salt. The C2 to C16 carboxylic acid magnesium salt and the C2 to C16 carboxylic acid potassium salt are not particularly limited. Preferred examples include magnesium acetate, potassium acetate, magnesium propionate, potassium propionate, magnesium 2-ethylbutanoate, potassium 2-ethylbutanoate, magnesium 2-ethylhexanonate, and potassium 2-ethylhexanoate.

The amount of the adhesion control agent is not particularly limited, and the preferable lower limit is 0.0005 parts by weight for 100 parts by weight of the polyvinyl acetal, and the preferable upper limit is 0.05 parts by weight. When the amount of the adhesion control agent is 0.0005 parts by weight or more, a laminated glass having higher penetration resistance can be obtained; when the amount of the adhesion control agent is 0.05 parts by weight or less, the interlayer film for laminated glass has much higher transparency. The more preferable lower limit of the amount of the adhesion control agent is 0.002 parts by weight, and the more preferable upper limit is 0.02 parts by weight.

The total amount of alkali metals, alkaline earth metals, and magnesium in the first and second resin layers is preferably 300 ppm or less in order to ensure that the first resin layer has high moisture resistance. For example, the alkali metals, alkaline earth metals, and magnesium may be metals derived from the adhesion control agent or from a neutralizer used for the synthesis of the polyvinyl acetal. The total amount of alkali metals, alkaline earth metals, and magnesium in the first and second resin layers is more preferably 200 ppm or less, still more preferably 150 ppm or less, and particularly preferably 100 ppm or less.

In the case where the interlayer film for laminated glass of the present invention is required to have heat shielding properties, any one of the thermoplastic resin layer, the first resin layer, and the second resin layer may contain a heat wave absorbing agent. Alternatively, a heat wave shielding layer containing a heat wave absorbing agent may further be laminated in addition to the thermoplastic resin layer, the first resin layer, and the second resin layer.

The heat wave absorbing agent is not particularly limited, as long as it shields infrared rays. Preferred is at least one selected from the group consisting of tin-doped indium oxide (ITO) particles, antimony-doped tin oxide (ATO) particles, aluminum-doped zinc oxide (AZO) particles, indium-doped zinc oxide (IZO) particles, tin-doped zinc oxide particles, silicon-doped zinc oxide particles, lanthanum hexaboride particles, and cerium hexaboride particles.

The interlayer film for laminated glass of the present invention may further include a sound insulation layer in order to improve the sound insulation properties. Any one of the thermoplastic resin layer, the first resin layer, and the second resin layer may have sound insulation properties to function as a sound insulation layer. Alternatively, a sound insulation layer may further be laminated in addition to the thermoplastic resin layer, the first resin layer, and the second resin layer.

The sound insulation layer may be, for example, a layer containing the plasticizer in an amount of 50 to 80 parts by weight for 100 parts by weight of the polyvinyl acetal. The sound insulation layer preferably contains a polyvinyl acetal, and more preferably contains polyvinyl butyral. As for the polyvinyl acetal in the sound insulation layer, the hydroxyl group content is preferably in the range of 20 to 28 mol %. The polyvinyl acetal in the sound insulation layer may be polyvinyl acetal A having an acetyl group content of 8 to 30 mol %, polyvinyl acetal B having an acetyl group content of more than 0 mol % and less than 5 mol % and a degree of acetalization of 70 to 85 mol %, or polyvinyl acetal C having an acetyl group content of 5 mol % or more and less than 8 mol % and a degree of acetalization of 65 to 80 mol %.

A laminated glass including the interlayer film for laminated glass of the present invention between a pair of glass plates is also one aspect of the present invention.

The glass plates may be common transparent glass plates. Examples include plates of inorganic glasses such as float glass plate, polished glass plate, figured glass plate, meshed glass plate, wired glass plate, colored glass plate, heat-absorbing glass plate, heat-reflecting glass plate, and green glass plate. Other examples include ultraviolet shielding glass plates including an ultraviolet shielding coat layer on a glass surface. Further examples of the glass plates include organic plastic plates made of polyethylene terephthalate, polycarbonate, polyacrylate, or the like.

The glass plates may include two or more types of glass plates. For example, the laminated glass may be a laminate including the interlayer film for laminated glass of the present invention between a transparent float glass plate and a colored glass plate such as a green glass plate. The glass plates may include two or more glass plates with a different thickness.

Advantageous Effects of Invention

The present invention provides an interlayer film for laminated glass which has high transparency, and can prevent flying pests from gathering thereon, and a laminated glass including the interlayer film for laminated glass.

DESCRIPTION OF EMBODIMENTS

The aspects of the present invention are described below in more detail based on Examples. The present invention is not limited to the Examples.

EXAMPLE 1

(1) Resin Composition for Thermoplastic Resin Layer

A plasticizer solution was prepared by mixing 0.2 parts by weight of a benzotriazole compound ("Tinuvin 326" from BASF Japan Ltd.) as the ultraviolet absorber and magnesium acetate tetrahydrate as the compound including a polyvalent metal with 40 parts by weight of triethylene glycol di-2-ethylhexanoate (3GO). The entire amount of the plasticizer solution was combined with 100 parts by weight of polyvinyl butyral (acetyl group content: 0.9 mol %, hydroxyl group content: 30.6 mol %, degree of butyralization: 68.5 mol %) obtained by acetalization of a polyvinyl alcohol (degree of polymerization: 1700) with n-butylaldehyde. The resulting mixture was sufficiently kneaded with mixing rolls. In this manner, a resin composition for a thermoplastic resin layer was prepared. The amount of the magnesium acetate tetrahydrate added to the triethylene glycol di-2-ethylhexanoate (3GO) was adjusted to control the magnesium concentration of an interlayer film for laminated glass to be formed to 160 ppm.
(2) Preparation of Coating Solution Containing Compound Having Structure Represented by General Formula (3)

A coating solution was prepared by dissolving 2.5% by weight of diethyl-2,5-dihydroxyterephthalate ("diethyl-2,5-dihydroxyterephthalate" from Aldrich), which corresponds to the compound having a structure represented by the general formula (3), in a solvent containing 50% by weight of tetrahydrofuran and 50% by weight of ethanol.
(3) Formation of Interlayer Film for Laminated Glass The resin composition for a thermoplastic resin layer was formed into a thermoplastic resin layer by extrusion from an extruder. The solution was applied to one of the surfaces (the surfaces with the largest area) of the thermoplastic resin layer such that the amount of diethyl-2,5-dihydroxyterephthalate ("diethyl-2,5-dihydroxyterephthalate" from Aldrich), which corresponds to the compound having a structure represented by the general formula (3), was 0.5 parts by weight for 100 parts by weight of the polyvinyl butyral. The thermoplastic resin layer coated with the solution was heated in an oven at 100° C. for 90 minutes to evaporate the solvent. Thus, an interlayer film for laminated glass was obtained. A change of the color of the interlayer film for laminated glass was visually observed. This suggests that a compound having a structure represented by the general formula (1) was produced. The thickness of the interlayer film for laminated glass was 800 μm.
(4) Production of Laminated Glass A 50 cm (length)×50 cm (width) piece was cut out from the interlayer film for laminated glass. The cut piece of the interlayer film for laminated glass was inserted between a pair of 50 cm (length)×50 cm (width) clear glass plates (thickness: 2.5 mm) to prepare a laminate. Pressure bonding was carried out by vacuum pressing of the laminate with a vacuum laminator at 90° C. for 30 minutes. After pressure bonding, the laminate was further pressure bonded in an autoclave at 140° C. at 14 MPa for 20 minutes. In this manner, a laminated glass was obtained.

EXAMPLES 2 to 8

An interlayer film for laminated glass and a laminated glass were obtained in the same manner as in Example 1, except that the compositions of the resin composition for a thermoplastic resin layer and the coating solution were as shown in Table 1.

COMPARATIVE EXAMPLE 1

An interlayer film for laminated glass and a laminated glass were obtained in the same manner as in Example 1, except that no solution was applied.
(Evaluation) The laminated glasses obtained in the examples and comparative examples were evaluated as follows.
(1) Evaluation of Spectral Transmittance The laminated glasses were measured for transmittance at 370 nm, 390 nm, 410 nm, 450 nm, 460 nm, 470 nm, 480 nm, 490 nm, and 500 nm with a spectrophotometer (U-4100 from Hitachi High-Technologies Corporation) in accordance with JIS R 3106.
(2) Evaluation of Visible Light Transmittance The laminated glasses were measured for visible light transmittance with a spectrophotometer (U-4100 from Hitachi High-Technologies Corporation) in accordance with JIS R 3106.
(3) Evaluation of Number of Winged Insects Attracted A transparent adhesive was applied to one of the glass surfaces of each of the laminated glasses (50 cm (length)×50 cm (width)). A halogen lamp was set on the side of the surface to which the transparent adhesive was not applied, and the glasses were left standing for one hour (from 20:00 to 21:00) in an outdoor environment (Shiga Minakuchi Plant, SEKISUI CHEMICAL CO., LTD., August 2013) with the lamp emitting white light. After standing, winged insects captured on the transparent adhesive were counted.

TABLE 1

| | | | | Example 1 | Example 2 | Example 3 | Example 4 | Example 5 | Example 6 | Example 7 | Example 8 | Comparative Example 1 |
|---|---|---|---|---|---|---|---|---|---|---|---|---|
| Resin composition for thermoplastic resin layer | Thermoplastic resin | Polyvinyl butyral | Parts by weight | 100 | 100 | 100 | 100 | 100 | 100 | 100 | 100 | 100 |
| | | | Hydroxyl group content (mol %) | 30.6 | 30.6 | 30.6 | 30.6 | 30.6 | 30.6 | 30.6 | 30.6 | 30.6 |
| | | | Degree of butyralization (mol %) | 68.5 | 68.5 | 68.5 | 68.5 | 68.5 | 68.5 | 68.5 | 68.5 | 68.5 |
| | | | Acetyl group content (mol %) | 0.9 | 0.9 | 0.9 | 0.9 | 0.9 | 0.9 | 0.9 | 0.9 | 0.9 |
| | Plasticizer | Triethylene glycol di-2-ethyl-hexanoate | Parts by weight | 40 | 40 | 40 | 40 | 40 | 40 | 40 | 40 | 40 |
| | Ultraviolet absorber | Tinuvin 326 | Parts by weight | 0.2 | 0.2 | 0.2 | 0.2 | 0.2 | 0.2 | 0.2 | 0.2 | 0.2 |
| | Compound including polyvalent metal | Magnesium acetate tetrahydrate | Parts by weight | 0.2 | 0.2 | 0.2 | 0.38 | 0.13 | 0 | 0.2 | 0.2 | 0.2 |
| | | | Magnesium concentration of thermoplastic resin layer (ppm) | 160 | 160 | 160 | 300 | 100 | 0 | 160 | 160 | 160 |

TABLE 1-continued

|  |  |  | Example 1 | Example 2 | Example 3 | Example 4 | Example 5 | Example 6 | Example 7 | Example 8 | Comparative Example 1 |
|---|---|---|---|---|---|---|---|---|---|---|---|
|  | Magnesium hexanoate | Parts by weight | 0 | 0 | 0 | 0 | 0 | 0.2 | 0 | 0 | 0 |
|  |  | Magnesium concentration of thermoplastic resin layer (ppm) | 0 | 0 | 0 | 0 | 0 | 160 | 0 | 0 | 0 |
| Coating solution | Concentration of diethyl-2,5-dihydroxyterephthalate (solvent: 50% by weight of tetrahydrofuran and 50% by weight of ethanol) | % by weight | 2.5 | 2.5 | 2.5 | 2.5 | 2.5 | 2.5 | 0 | 0 | — |
|  | Concentration of dimethyl-2,5-dihydroxyterephthalate (solvent: 50% by weight of tetrahydrofuran and 50% by weight of ethanol) | % by weight | 0 | 0 | 0 | 0 | 0 | 0 | 2.5 | 0 | — |
|  | Concentration of diethyl 2,5-diaminoterephthalate (solvent: 50% by weight of tetrahydrofuran and 50% by weight of ethanol) | % by weight | 0 | 0 | 0 | 0 | 0 | 0 | 0 | 2.5 | — |
| Amount of compound having structure represented by general formula (3) or (4) applied for 100 parts by weight of polyvinyl butyral |  | Parts by weight | 0.5 | 1.5 | 0.1 | 0.5 | 0.5 | 0.5 | 0.5 | 0.5 | — |
| Evaluation | Spectral transmittance | 370 nm % | 0.01 | 0.01 | 0.1 | 0.01 | 0.01 | 0.01 | 0.05 | 0.02 | 0.1 |
|  |  | 390 nm % | 0.05 | 0.02 | 0.2 | 0.05 | 0.06 | 0.05 | 0.06 | 0.02 | 0.1 |
|  |  | 410 nm % | 0.1 | 0.01 | 6.0 | 0.04 | 0.1 | 0.1 | 0.1 | 0.2 | 71.9 |
|  |  | 450 nm % | 9.3 | 3.4 | 39.8 | 6.7 | 37.5 | 9.9 | 9.0 | 10.1 | 87.8 |
|  |  | 460 nm % | 6.7 | 2.1 | 37.7 | 5.1 | 35.2 | 7.1 | 7.1 | 7.8 | 88.3 |
|  |  | 470 nm % | 5.4 | 1.5 | 36.5 | 4.3 | 33.9 | 5.4 | 5.7 | 6.5 | 88.7 |
|  |  | 480 nm % | 5.2 | 1.5 | 36.5 | 4.2 | 33.9 | 4.8 | 5.2 | 5.7 | 88.8 |
|  |  | 490 nm % | 5.5 | 1.6 | 37.5 | 4.7 | 34.9 | 4.8 | 5.6 | 6.2 | 89.0 |
|  |  | 500 nm % | 6.6 | 2.1 | 40.1 | 6.0 | 37.6 | 5.6 | 6.9 | 8.2 | 89.2 |
|  | Visible light transmittance | % | 71.6 | 70 | 81.1 | 70.2 | 80.4 | 71.2 | 71.8 | 73 | 88.9 |
|  | Number of winged insects attracted | Number | 5 | 2 | 9 | 3 | 8 | 5 | 7 | 9 | 31 |

INDUSTRIAL APPLICABILITY

The present invention provides an interlayer film for laminated glass which has high transparency, and can prevent flying pests from gathering thereon, and a laminated glass including the interlayer film for laminated glass.

The invention claimed is:

1. An interlayer film for laminated glass comprising a thermoplastic resin layer containing a thermoplastic resin and a compound selected from the group consisting of the following formula (1) and the following formula (2):

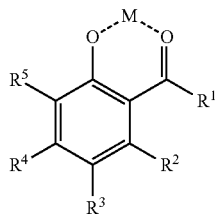
(1)

in formula (1), $R^1$ is —O—$R^{11}$, wherein $R^{11}$ is a $C_1$ to $C_{10}$ alkyl group,
$R^2$, $R^3$, $R^4$ and $R^5$ are individually an organic group, and
M is a polyvalent metal,

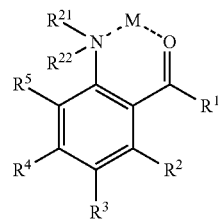
(2)

in formula (2), $R^1$ is —O—$R^{11}$, wherein $R^{11}$ is a $C_1$ to $C_{10}$ alkyl group,
$R^2$, $R^3$, $R^4$, $R^5$, $R^{21}$ and $R^{22}$ are individually an organic group, and
M is a polyvalent metal,
wherein a laminated glass comprising the interlayer film between two clear glass plates having a thickness of 2.5mm exhibits a transmittance at 450 nm of 39.8% or lower and a visible light transmittance of 70% or higher, as determined with a spectrophotometer in accordance with JIS R 3106.

2. The interlayer film for laminated glass according to claim 1,
wherein in formula (1) and formula (2), $R^3$ is a hydrogen atom, a hydroxyl group, or a group represented by $NR^{25}R^{26}$, wherein $R^{25}$ and $R^{26}$ are individually an organic group, R⁴ is a hydrogen atom, a hydroxyl group, or an organic group including an ester bond, and R⁵ is a hydrogen atom or a hydroxyl group.

3. A laminated glass comprising a laminate including the interlayer film for laminated glass according to claim 2 between a pair of glass plates.

4. The interlayer film for laminated glass according to claim 2, wherein M in formula (1) and formula (2) is magnesium.

5. The interlayer film for laminated glass according to claim 1, wherein M in formula (1) and formula (2) is magnesium.

6. A laminated glass comprising a laminate including the interlayer film for laminated glass according to claim 4 between a pair of glass plates.

7. A laminated glass comprising a laminate including the interlayer film for laminated glass according to claim 5 between a pair of glass plates.

8. A laminated glass comprising a laminate including the interlayer film for laminated glass according to claim 1 between a pair of glass plates.

* * * * *